US007124119B2

(12) United States Patent
Bigus et al.

(10) Patent No.: US 7,124,119 B2
(45) Date of Patent: Oct. 17, 2006

(54) COMMUNICATION BETWEEN INTELLIGENT AGENTS AND HUMANS IN A DISTRIBUTED SYSTEM ENVIRONMENT

(75) Inventors: Joseph P. Bigus, Rochester, MN (US); Anthony M. Dunbar, Rochester, MN (US); Gregory R. Hintermeister, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 10/403,649

(22) Filed: Mar. 31, 2003

(65) Prior Publication Data

US 2004/0205034 A1    Oct. 14, 2004

(51) Int. Cl.
*G06F 15/00* (2006.01)

(52) U.S. Cl. .............................. 706/10; 706/12; 706/14; 706/19; 706/45; 714/2; 714/38; 714/39; 714/48; 714/49; 714/100

(58) Field of Classification Search ................. 706/11, 706/15, 10, 46, 47, 50, 61; 714/2, 4, 15, 714/19, 21, 25, 26, 30, 31, 37–39, 42, 44, 714/46–49, 100
See application file for complete search history.

(56) References Cited

U.S. PATENT DOCUMENTS

| 6,088,689 | A | 7/2000 | Kohn et al. |
| 6,460,070 | B1 * | 10/2002 | Turek et al. ................. 709/202 |
| 6,487,677 | B1 * | 11/2002 | Jantz et al. ...................... 714/2 |
| 6,529,954 | B1 * | 3/2003 | Cookmeyer et al. ......... 709/224 |
| 6,751,753 | B1 * | 6/2004 | Nguyen et al. ................ 714/39 |

| 2002/0178395 | A1 | 11/2002 | Chen et al. |
| 2004/0215710 | A1 | 10/2004 | Awe et al. |
| 2005/0177792 | A1 | 8/2005 | Awe et al. |

OTHER PUBLICATIONS

Karl-Fredrik Blixt and Rickard Oberg, "Software Agent Framework Technology", Mar. 9, 2000.
Bjorn Hermans, http://www.firstmonday.dk/issues/issue2_3/ch_123, "Intelligent Software Agents on the Internet: An Inventory of Currently Offered Functionality in the Information Society and a Prediction of (Near) Future Developments", printed Jan. 29, 2003.
Douglas, C. Smathers and Steven Y. Goldsmith, "Agent Concept for Intelligent Distributed Coordination in the Electric Power Grid", printed Mar. 2001.
James Ingham, "What is an Agent?", Technical Report #6/99 (orinigally written in 1997), pp. 1-16.
David Muslines and Barney Pell, "Agents with Adjustable Autonomy", Technical Report SS-99-06, Papers from the 1999 AAAI Spring Symposium.
Robyn Kozierok, "MITRE IMP Developers' Guide", Last updated Apr. 6, 1999.

* cited by examiner

*Primary Examiner*—David Vincent
(74) *Attorney, Agent, or Firm*—Patterson & Sheridan, LLP

(57) ABSTRACT

A method, apparatus and article of manufacture for problem identification and resolution using intelligent agents. In at least one embodiment, an agent is a software element configured to detect a situation (e.g., problem or problems) and take steps to preserve a context in which the situation occurs. The agent may also be configured to identify one or more courses of action (e.g., solutions) to be taken in response to the situation. In one embodiment, a user trains an agent to take a particular action upon detecting a particular problem. The training may be initiated after accessing a log containing details about the problem context and recommended courses of action.

50 Claims, 10 Drawing Sheets

AGENT45 HISTORY - SYSTEM 5

AGENT : AGENT45
SYSTEM : SYSTEM5
SEVERITY : —— 802

| Logged | Action | Description |
|---|---|---|
| ☐ 4/4/02 11:00 AM | File "MYFILE" is full. | Deleted |
| ☐ 4/4/02 8:00 AM | Comm line 23 is not responding. | Vary on |
| ☐ 4/2/02 10:00 PM | Object YPT345 was deleted. | Disabled user |
| ☐ 4/1/02 12:04 PM | Disk pool 23 needs balancing. | Balanced disk pool |

804 —— 806

[ TEACH ]   [ CLEAR ]   [ CANCEL ]   [ HELP ? ]
  810         808

COMMUNICATION BETWEEN INTELLIGENT AGENTS AND HUMANS IN A DISTRIBUTED SYSTEM ENVIRONMENT

CROSS-REFERENCE TO RELATED APPLICATIONS

This application is related to U.S. Ser. No. 10/403,950, filed on even date herewith by Awe at al. and entitled REMOTE CONFIGURATION OF INTELLIGENT SOFTWARE AGENTS, herein incorporated by reference in its entirety.

BACKGROUND OF THE INVENTION

1. Field of the Invention

The present invention generally relates to data processing and, more particularly, to intelligent software agents.

2. Description of the Related Art

The automation of tedious and complex tasks has long been a goal of computer science. In this regard, intelligent agents have attracted significant attention in recent years. Generally, an agent is a computer system or software program that supports a user with accomplishment of some task or activity. Intelligent software agents may be characterized as long-running processes that monitor information concerning their environment via events or polling, process that information using procedural or declarative domain knowledge, and then take actions to respond to situations detected in their environment.

Agents have found utility in a variety of environments. For example, on the Internet, an agent is a program that gathers information or performs some other service on a regular schedule and without the immediate presence of a human user. Typically, an agent program, using parameters provided by a user, searches all or some part of the Internet gathering information of interest to the user, and then presents it to the user on a periodic basis. A particular example of an agent is the email reminder service that alerts the user about news on specified topics of interest. A number of similar agents compare shopping prices and bring the news back to the user. Other types of agents include specific site watchers that tell users when the site has been updated or look for other events and analyst agents that not only gather but also organize and interpret information.

In a commercial multiagent system application, hundreds or thousands of software agents could be running at one time. When managing a large number of systems, an administrator depends on these agents to take action. However, the administrator must maintain some degree of interaction (i.e., control over and communication with) with the agents. Interaction is needed to allow observation of an agent's behavior, to prevent agents from performing undesired actions, and to facilitate changes to the agents, if needed. These needs must be met without sacrificing the utility of the agent.

However, the conventional agent lifecycle does not provide the degree of interaction necessary to achieve the foregoing needs. A conventional agent lifecycle includes training, start up and interaction, problem identification and problem resolution. An agent is typically trained using a set of data or encoded rules. The agent is then invoked (e.g., instantiated) and allowed to interact with its environment according to the data or rules. Upon identifying a problem the agent either asks permission of a user to fix the problem, or attempt to fix the problem automatically. The information relating to the problem and its resolution may be logged.

The current approaches to problem identification and resolution using agents are problematic. Specifically, if the agent is configured to ask permission to fix the problem, the agent is suspended from performing its functions until the user provides an answer. No mechanism exists for allowing the agent to continue its functions pending an answer from the user. If the agent is configured to fix the problem automatically (i.e., without requesting explicit permission from the user upon identification of the problem), the agent may pursue a solution which is later considered to be undesirable by the user (e.g., the course of action taken by the agent failed to adequately solve the problem, and/or had destructive results). In addition, the only remedy to prevent a reoccurrence under similar circumstances is to take the agent off-line and retrain it. The success of a retraining effort depends, of course, upon the user's understanding of the problem and the circumstances giving rise to the problem. For this understanding, the user may resort to the log in which the problem is recorded. However, the log provides little more than a top-level generalization of the problem and is, therefore, of little value to a user seeking a more comprehensive understanding of the problem.

Therefore, there is a need for agents capable of more efficient problem resolution.

SUMMARY OF THE INVENTION

The present invention generally relates to methods, apparatus and articles of manufacture for problem identification and resolution using intelligent agents.

One embodiment provides a method, performed by an intelligent software agent in a computerized environment. The method includes identifying a problem in the computerized environment; storing a context of the problem. The context of the problem suffices to validate the existence of the problem at a later time.

Another method performed by an intelligent software agent in a computerized environment includes performing an assigned function; identifying a problem; and storing a context of the problem. The context of the problem suffices to validate the existence of the problem at a later time. One or more possible actions to address the problem may also be stored, but, in any case, performance of the assigned function continues prior to performing any action in response to the problem.

In another embodiment, either of the foregoing methods is implemented by executing program resident on or propagating in a computer readable medium.

Yet another embodiment provides a computer defining a computerized environment in which plurality of intelligent software agents are executing. A log resident on the system contains at least one situation data structure, each situation data structure being created by one of the intelligent software agents in response to detecting a problem and containing a problem context describing a state of the computerized environment at a time when the intelligent software agent identified the problem. The context suffices to validate the existence of the problem at a later time. A user interface allows interaction between a user and the plurality of intelligent software agents, and between the user and the situation data structures.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 8 is an instance of a user interface displaying the logged history for a particular agent.

DETAILED DESCRIPTION OF THE PREFERRED EMBODIMENTS

Figure 1:
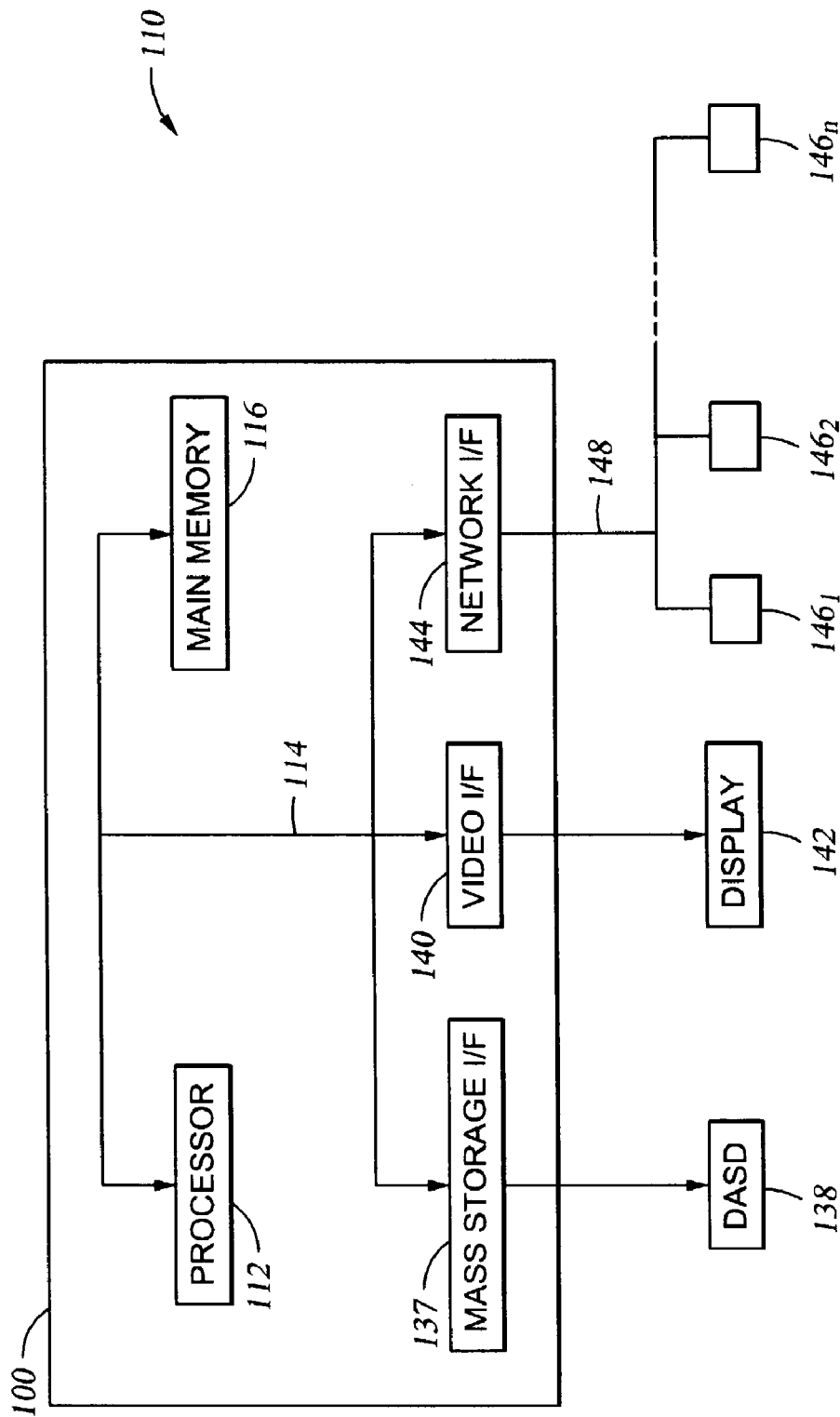
FIG. 1 is a computer system which may become a special-purpose apparatus according to an embodiment of the invention when configured with the features and functionality described herein.

The present invention generally relates to methods, apparatus and articles of manufacture for problem identification and resolution using intelligent agents. In at least one embodiment, an agent is a software element configured to detect a situation (e.g., problem or problems) and take steps to preserve a context in which the situation occurs. The agent may also be configured to identify one or more courses of action (e.g., solutions) to be taken in response to the situation. In a particular embodiment, an agent is a continuously running element (i.e., not a single computation that maps a single input a single output and then terminates) that is characterized as being autonomous, reactive, and pro-active. "Autonomy" generally refers to the ability to act without direct intervention from humans or otherwise. Autonomy may further refer to an agent having control over its internal state. "Reactive" generally means being capable of maintaining an ongoing interaction with the environment, and responding timely to changes occurring within the environment. "Pro-active" generally refers to the capability of taking the initiative, and generating goals and acting rationally to achieve them. Pro-active may further imply that the agent is not solely event-driven. An intelligent software agent may also be characterized as collaborative (i.e., having the ability to modify requests, ask for clarification or even refuse certain requests), communicative (i.e., able to engaging complex communication with other entities, such as agents and human beings, to facilitate accomplishment of its goals), flexible (i.e., having the ability to choose which actions to invoke in response to the state of its external environment), mobile (i.e., able to transport itself from one machine to another across different system architectures and platforms) and adaptive (i.e., capable of automatically customizing itself based on previous experience and changes in its environment). However, it is understood that the foregoing agent characteristics are merely illustrative and agents of the present invention need not exhibit all of these characteristics and may exhibit others.

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 shows a computer 100 (which is part of a computer system 110) that becomes a special-purpose computer according to an embodiment of the invention when configured with the features and functionality described herein. The computer system 100 may represent any type of computer, computer system or other programmable electronic device, including a client computer, a server computer, a portable computer, a personal digital assistant (PDA), an embedded controller, a PC-based server, a minicomputer, a midrange computer, a mainframe computer, and other computers adapted to support the methods, apparatus, and article of manufacture of the invention. A computer may include any electronic device having at least one processor, and may be a standalone device or part of a network. Illustratively, the computer 100 is part of a networked system 110. In this regard, the invention may be practiced in a distributed computing environment in which tasks are performed by remote processing devices that are linked through a communications network. In a distributed computing environment, program modules may be located in both local and remote memory storage devices. In another embodiment, the computer 100 is a standalone device. The term "computer system" shall mean a computer coupled by communication means (e.g., a local area network or a wide area network) to another device (i.e., another computer).

In any case, it is understood that FIG. 1 is merely one configuration for a computer system. Embodiments of the invention can apply to any comparable configuration, regardless of whether the computer system 100 is a complicated multi-user apparatus, a single-user workstation, or a network appliance that does not have non-volatile storage of its own.

The computer 100 could include a number of operators and peripheral systems such as for example, a mass storage interface 137 operably connected to a storage device 138, a video interface 140 operably connected to a display 142, and a network interface 144 operably connected to the plurality of networked devices 146 (which may be representative of the Internet). Although storage 138 is shown as a single unit, it could be any combination of fixed and/or removable storage devices, such as fixed disc drives, floppy disc drives, tape drives, removable memory cards, or optical storage. The display 142 may be any video output device for outputting viewable information.

Computer 100 is shown comprising at least one processor 112, which obtains instructions and data via a bus 114 from a main memory 116. The processor 112 could be any processor adapted to support the methods of the invention. In particular, the computer processor 112 is selected to support the features of the present invention. Illustratively, the processor is a PowerPC® processor available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device (e.g., direct access storage device 138) or on another computer coupled to the computer 100 via bus 114. Thus, main memory 118 and storage device 134 could be part of one virtual address space spanning multiple primary and secondary storage devices.

Figure 2:
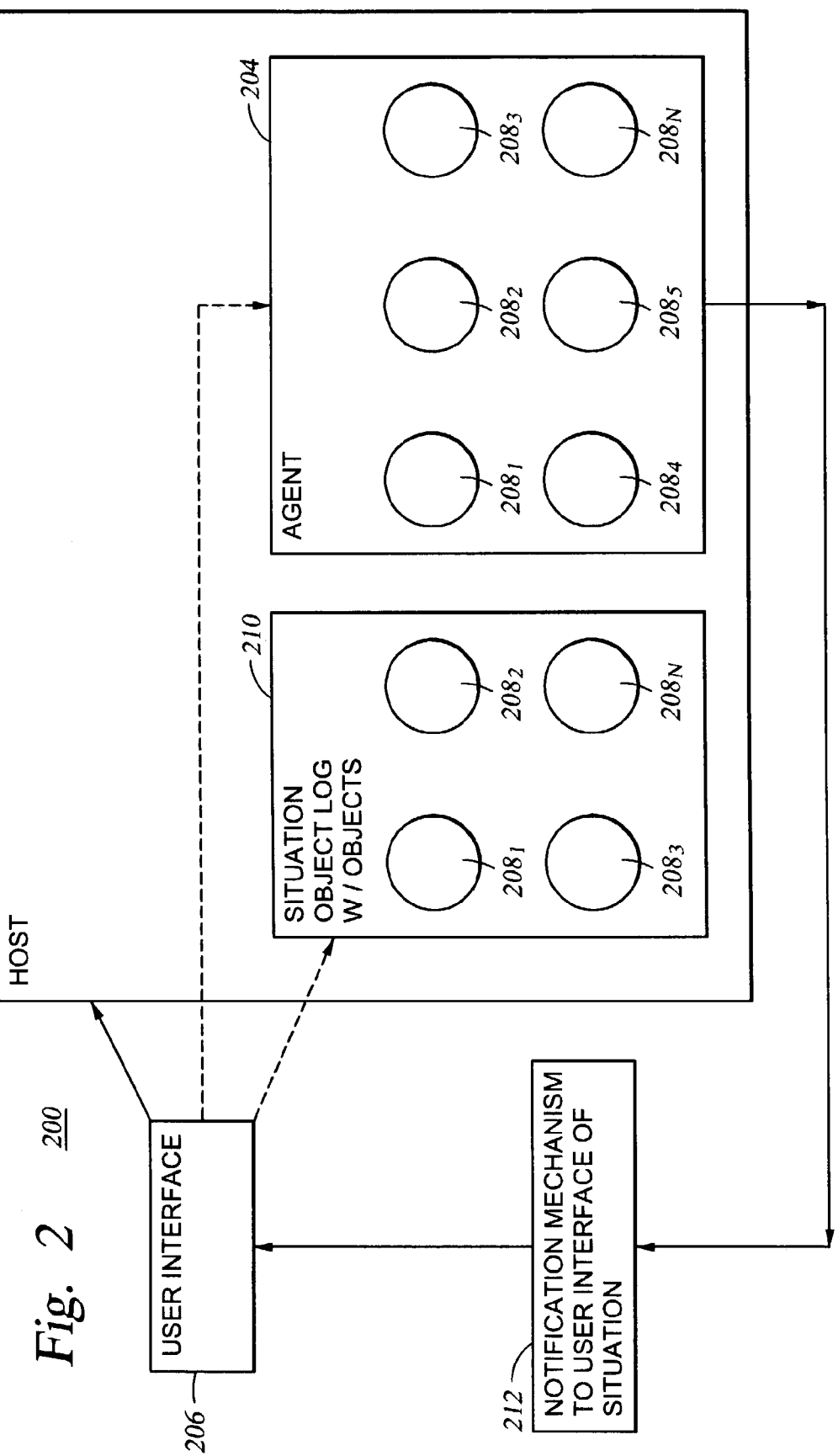
FIG. 2 is an architectural block diagram of a computerized environment configured with intelligent software agents.

FIG. 2 is a block diagram of an environment 200 which may be resident on the computer 100, or on the network of computers (e.g., network devices 146). In general, a host 202 is shown providing environment for plurality of intelligent software agents $204_{1-N}$ (collectively, agents 204). The host 202 may be representative of a computer system, a network of computer systems or an instance of an executing program (e.g., a server). In one embodiment, the host 202 is (or is part of) the ABLE™ platform, available from International Business Machines, Inc. In the context of a network, the agents themselves may be spread across multiple systems and performing various functions. In one embodiment, the agents 204 are capable of migrating between systems. The agents 204 are also capable of interaction with human beings and, preferably, with one another and with the host 202. Interaction with human beings is facilitated by the provision of a user interface 206, which is preferably a graphical user interface. The user interface 206 also enables interaction between human beings and the host 202, and a plurality of situation objects $208_{1-N}$ (collectively, situation objects 208). In one embodiment, the user interface 206 may be remotely located relative to the agents to allow for remote configuration of the agents. U.S. patent application Ser. No. 10/403, 950, entitled "REMOTE CONFIGURATION OF INTELLIGENT SOFTWARE AGENTS" describes embodiments for remotely configuring agents as well as real-time generation of configuration panels, and is hereby incorporated by reference in its entirety.

The situation objects may be stored in a log 210. Although shown resident with the host 202, it is contemplated that the situation objects 208 may be stored in a remotely located central data storage area, or be distributed across multiple data storage areas. In general, situation objects are created by agents 204 and provide a repository for a problem context that is connected by the agent creating the situation object. Details of the situation objects will be described below.

Figure 3:
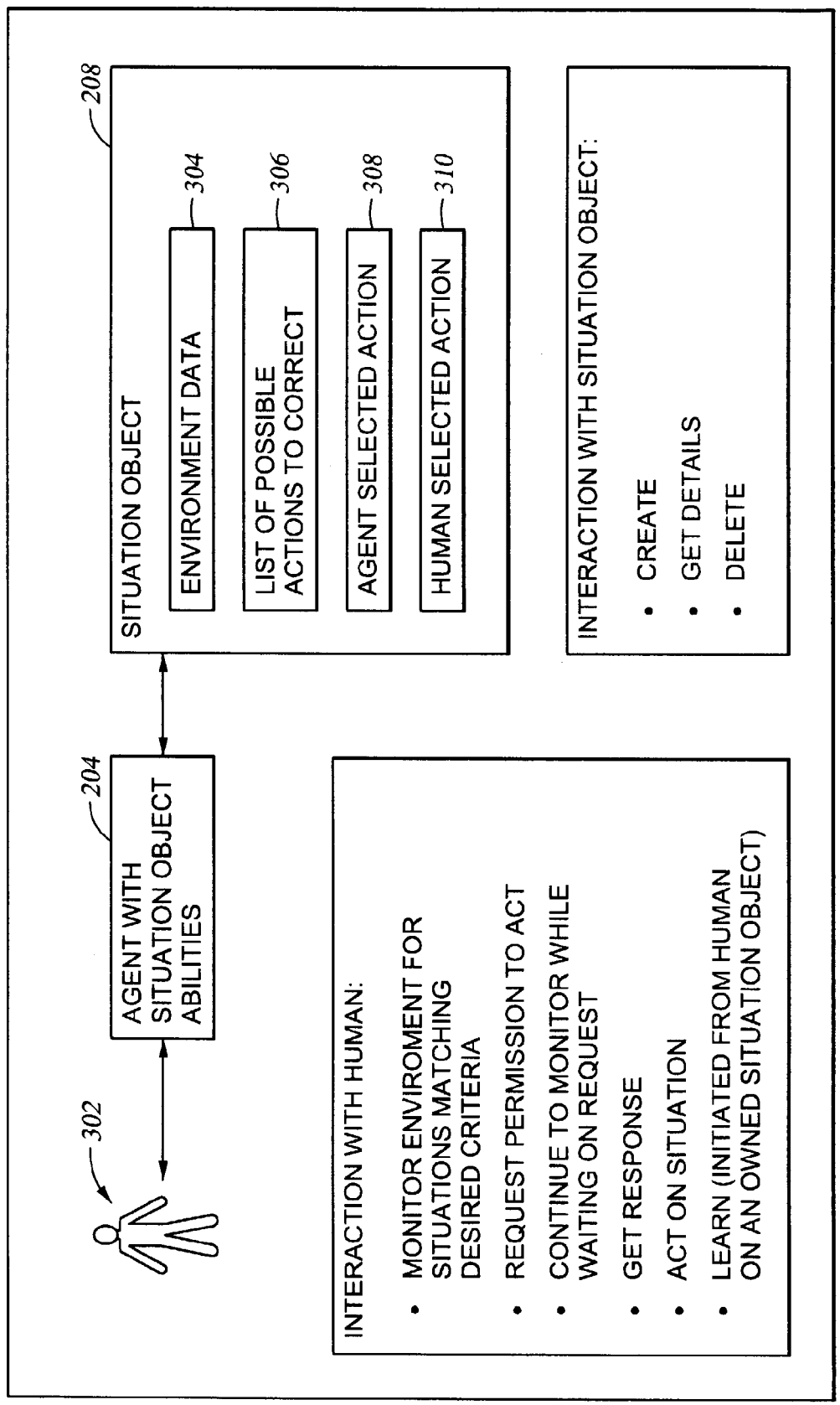
FIG. 3 is a block diagram characterizing interactions between intelligent software agents and humans, and between intelligent software agents and situation objects.

With reference now to FIG. 3, a diagram illustrating aspects of the agents 204 is shown. In particular, FIG. 3 identifies interactions between agents 204 and a human operator 302 and between agents 204 and situation objects 208. In general, each agent 204 installed on the host 204 is a software element configured to monitor the environment of the host 204 and detect a problem(s) that it is trained to solve. Upon detecting a problem, the agent may take a predefined action or send a request to the human operator 302. In one embodiment, the agent sends a request to the human operator 302 by invoking a notification mechanism 212 (shown in FIG. 1). The notification mechanism 212 may alert the human operator 302 of the problem via the user interface 206. Because the notification function has been off-loaded to the notification mechanism 212, the agent is free to continue monitoring the host environment for problems while waiting on the response from the human operator 302. As will be explained in more detail below, it is also contemplated that the human operator 302 may teach the agent 204 to the basis of information recorded in the situation object created by the agent for the particular problem being addressed.

A situation object 208 is created by an agent 204 upon detection of a problem by the agent 204. The situation object 208 may be any data structure providing a repository populated by the agent with information describing the context of the problem encountered by the agent. In general, the information contained in the situation object 208 allows a user to fully appreciate the state of the agent's environment at the time of detecting the problem. Accordingly, the situation object 208 includes environment data 304. Illustrative environment data in the context of system management includes metrics such as status of items the agent is monitoring, trace data, CPU usage, job details, interactive response time, transaction rate, batch logical database I/O, disk arm utilization, disk storage, disk IOP utilization, communications IOP utilization, communications line utilization, LAN utilization, warnings (such as for machine pool faults, user pool faults, jobs exceeding thresholds), messages (e.g., IDs, text, severity of problem, files locked for unknown reasons, etc.) and other information considered relevant by the agent 204 in characterizing the problem and determining a solution. Environment data also includes criteria to determine if the situation is still a problem at a later time. The situation object 208 may also include intelligence (internal state data) provided by the agent that detected the situation. For example, internal agent state data may include neural networks (serialized), decision trees, inferencing context, bound variables, function list bindings, fuzzy states, and any other agent internal state information. It is noted that, for a given event, different agents may be configured to examine different metrics and apply different agent intelligence. Accordingly, the definition of a problem context will depend upon the agent assessing the problem.

The situation object 208 may also include an action list 306 of possible actions determined by the agent 204 to be acceptable in response to the detected problem. If the agent 204 is configured with the necessary training (e.g., rule set) and authority, the agent 204 may perform one of the possible actions in the action list 306. This action is stored in an agent-selected action field 308 and may be accessed at a later time. If the agent is not configured with the requisite authority, the situation object 208 may include a human-selected action field 310 for storing an action selected by a human 302 in response to a request from the agent.

It should be understood that the situation object described with reference to FIG. 3 is merely illustrative. Those skilled in the art will recognize other embodiments within the scope of the present invention. For example, it is contemplated that the agent creating and populating the situation object need not be configured to identify possible actions which may be taken in response to the problem. Instead, an agent may be configured merely to identify the problem and store the problem context to the situation object. Another entity configured to determine possible actions (e.g., a problem solving agent or a human operator) may subsequently access the situation object. It is also contemplated that, in some cases, a situation object is passed between (i.e., accessed by) a plurality of agents cooperating to solve a complex situation. Each of these features is made possible because the situation object 302 comprehensively captures and preserves a problem context.

Figure 4:
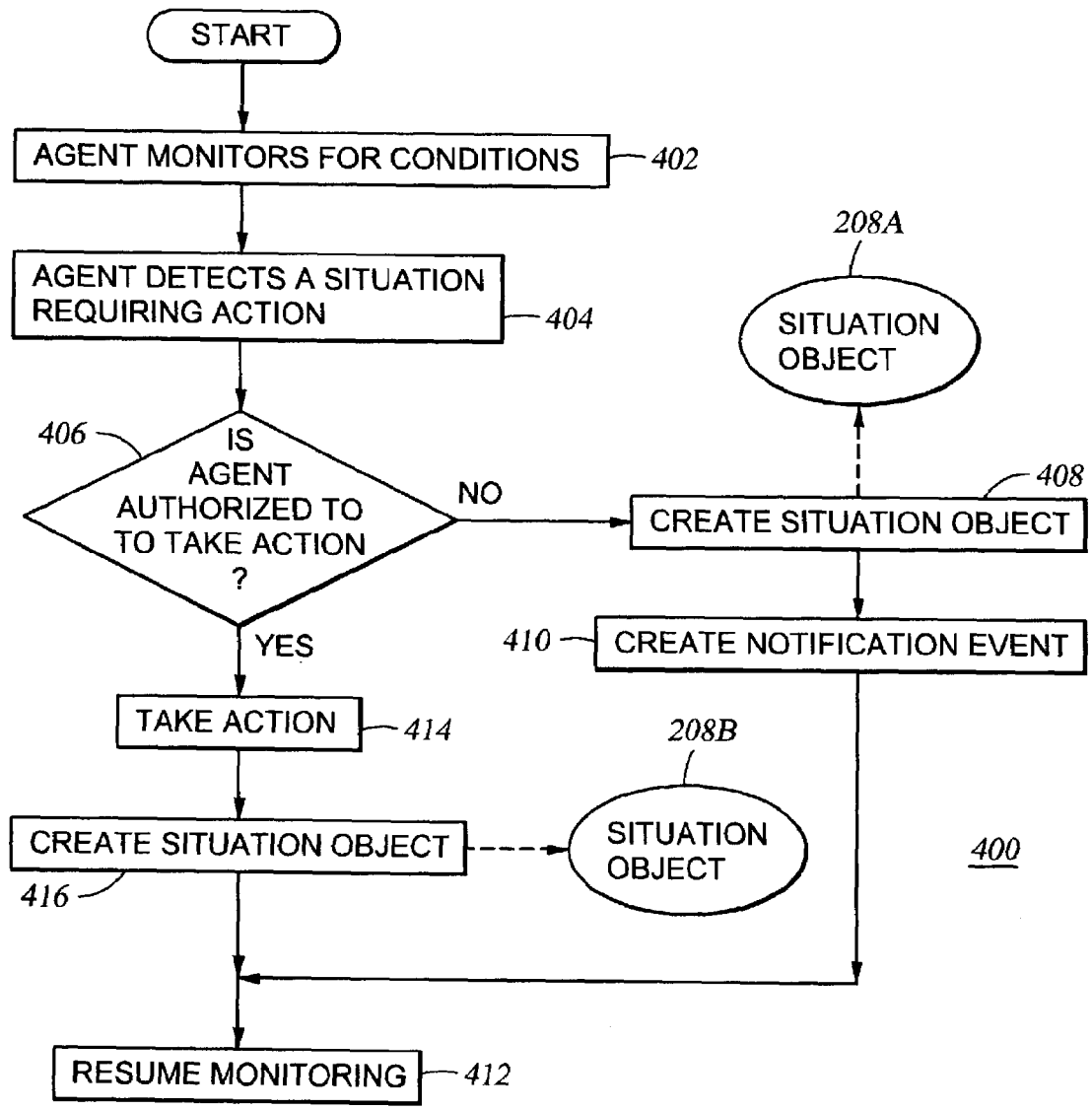
FIG. 4 is a flowchart illustrating the behavior of an intelligent software agent.

FIG. 4 shows one embodiment of a method 400 illustrating the operation of an agent 204. Once an agent is instantiated and placed in service, the agent monitors (step 402) for conditions for which is responsible, as defined by the agent (e.g., rule set, neural net, fuzzy logic). Eventually, the agent may detect (step 404) a situation which it has been configured to detect and for which some action is required. The agent then determines (step 406) whether it is authorized to take action. If not, the agent creates (step 408) a situation object 208A into which the agent stores the information described above with reference to FIG. 3. In particular, the agent stores the environment data describing the state of the environment at the time of the situation detected, as well as a list of possible actions which may be taken in response to the situation. The situation object 208A may then be stored in the situation log 210 (shown in FIG. 2). Because the agent is not responding to the situation, a notification event is issued (step 410). Specifically, the notification mechanism 212 (shown in FIG. 2) is invoked by the agent. In one embodiment, the notification mechanism 212 is implemented as a queue mechanism. Thus, the agent adds an event to a queue. Then, when the user interface scans the queue, the user is shown all situations that require a response. In other embodiments, the notification mechanism 212 is implemented via email, pagers, instant messaging, etc.

The notification mechanism 212 may be configured to notify the user of the situation by any variety of means. For example, a non-modal dialog box may be presented to the user. Alternatively, the user may be notified by some less intrusive means, such as a flashing icon on a task bar, as is commonly done to notify users of unread email that has just been received. The user may then open the appropriate interface screen to access the details of the situation. In still another embodiment, described in more detail below, the user accesses a list of pending notification events via the user interface 206. The details of any particular situation may then be accessed by selecting the appropriate entry from the list. One interface screen/dialog for viewing the details of a situation will be described below with respect to FIG. 6. In any case, having off-loaded the notification requirement, the agent is free to resume monitoring (step 412).

If, at step 406, the agent detects a situation for which it is authorized to take action, the agent takes a selected course of action and then creates a situation object 208B. In this case, the situation object 208B will include all of the information described above with reference to step 408 (describing the creation of a situation object 208A when the agent does not have the necessary authority to take action) as well as an indication of the selected course of action. The agent then resumes monitoring (step 412).

Figure 5:
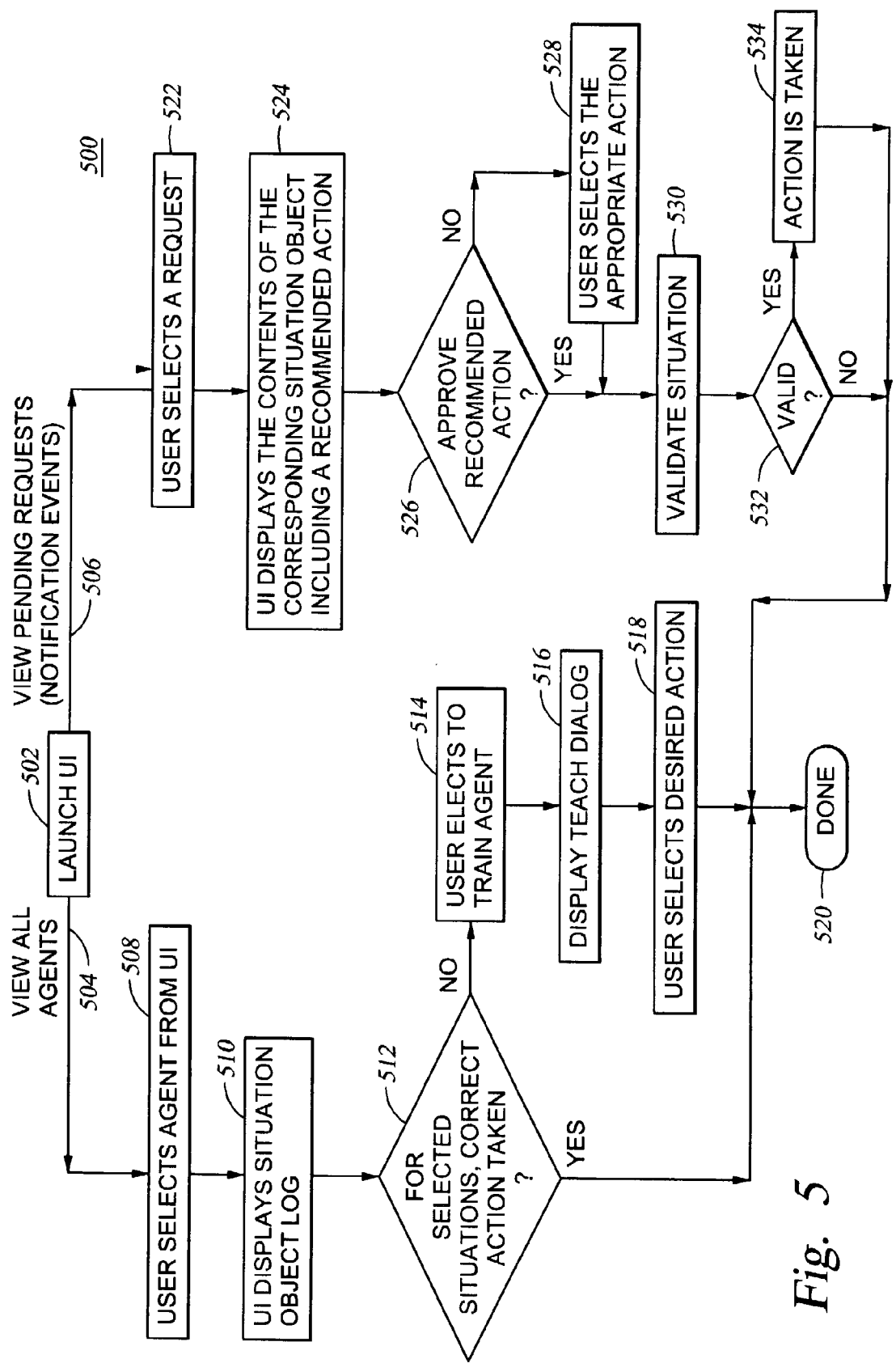
FIG. 5 is a flowchart illustrating features made available through a user interface.

Referring now to FIG. 5, a method 500 is shown illustrating the interaction between a user and a situation object, and between the use and the agent. Interaction occurs via the user interface 206 (shown in FIG. 1) and the various dialog windows made available through the user interface 206. Accordingly, reference is also made to FIGS. 6–8 which illustrate various screens/dialogs of the user interface 206.

Figure 6:
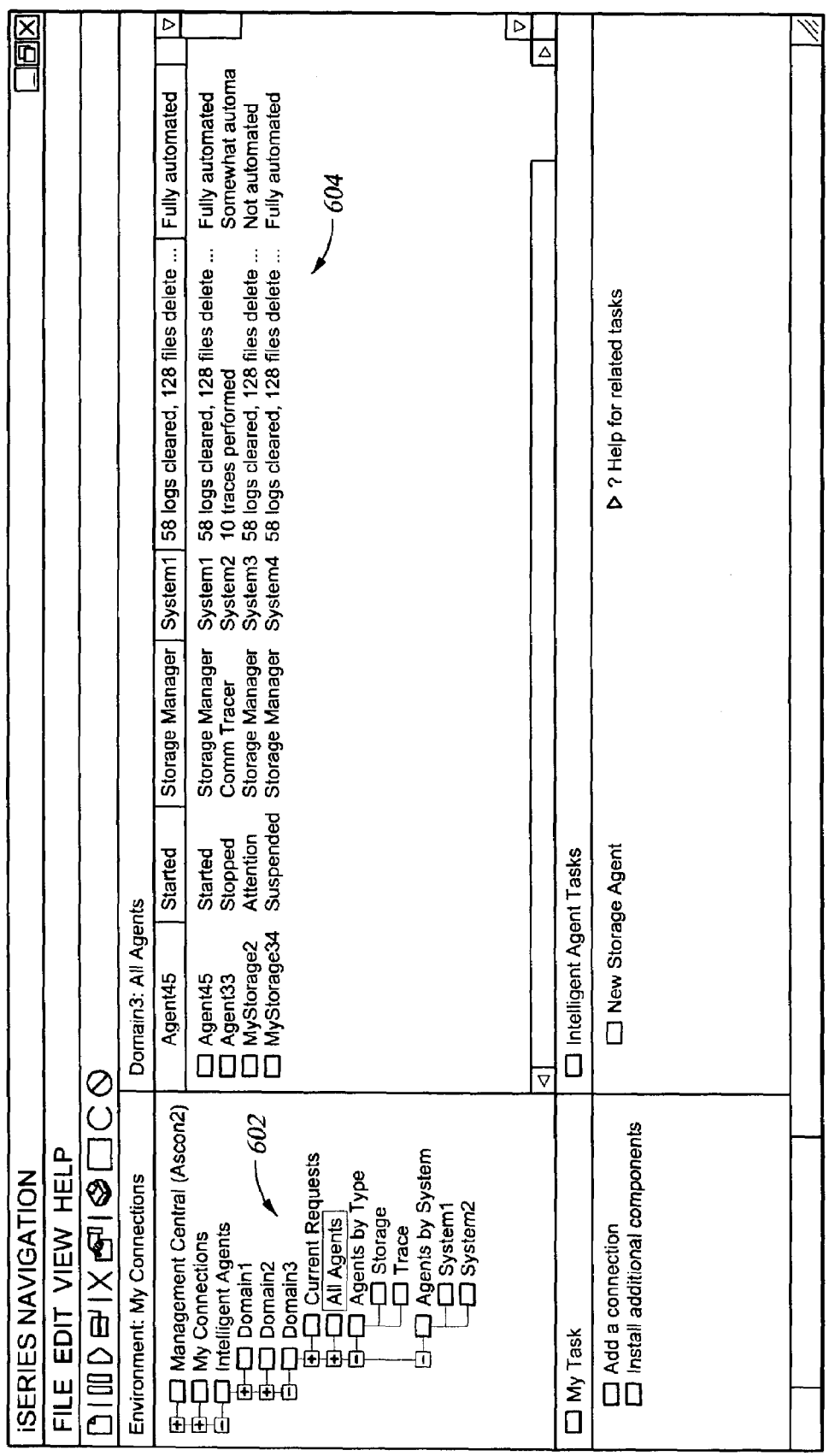
FIG. 6 is an instance of a user interface displaying all agents resident on a host.

Generally, the method 500 is entered into when the user launches the user interface 206 (step 502). An illustrative representation of the user interface 206 is shown in FIG. 6. The user interface 206 includes a directory tree 602 from which a container may be selected to view details of a subdirectory. Illustratively, if the "All Agents" container is selected (logic line 504), each of the agents running on the host is displayed in a frame 604. The user may then view the situation object log for a given agent by highlighting the desired agent in the frame 604 and then selecting (step 508) a "View Log" menu item (not shown) from the drop-down menu (not shown) display upon selecting the "View" menu from the menu bar. The user interface then displays a situation object log dialog window 800 illustrated in FIG. 8. The situation object log dialog window 800 displays the contents of the situation log 210 (shown in FIG. 2) for the selected agent (illustratively "agent 45"). Generally, the window 800 displays a plurality of records for each of the situations handled by the agent. Each record is defined by an entry under a logged column 802, a description column 804 and an action column 806. The logged column 802 displays a time and date stamp indicating when the situation was logged. A brief description of the situation is provided under the description column 804. If an action was taken in response to the situation, the action is indicated under the action column 806. The user may then make an assessment of the action taken (step 512). If the user determines the action was appropriate processing is complete (step 520). However, in some cases, the user may determine that the action taken by the agent was inappropriate or undesired (determined at step 512). Accordingly, a user may elect to train the agent (step 514). Training may be accomplished by selecting (e.g., highlighting) one of the records and then click a "Teach" button 810. In response, the user interface displays a teach dialog window 900, illustrated in FIG. 9. Summary information 902 is shown at an upper end of the teaching dialog window 900, and may include some of the summary information shown in the dialog window 1000. In addition, a problem statement 904 and a response statement 906 indicate the original problem detected and action taken by the agent, respectively. To train (or re-train) the agent, the user makes a selection from a drop-down menu 908 and then clicks the OK button 910 (corresponding to step 518 of FIG. 5). In one embodiment, a checkbox 912 is provided to automate the selected action in the event of future occurrences of the same problem. It is further contemplated that a user may access a list of similar situation objects and choose to apply the selected action to all or some of these related objects. Processing for the selected situation object is then complete (step 520).

Figure 7:
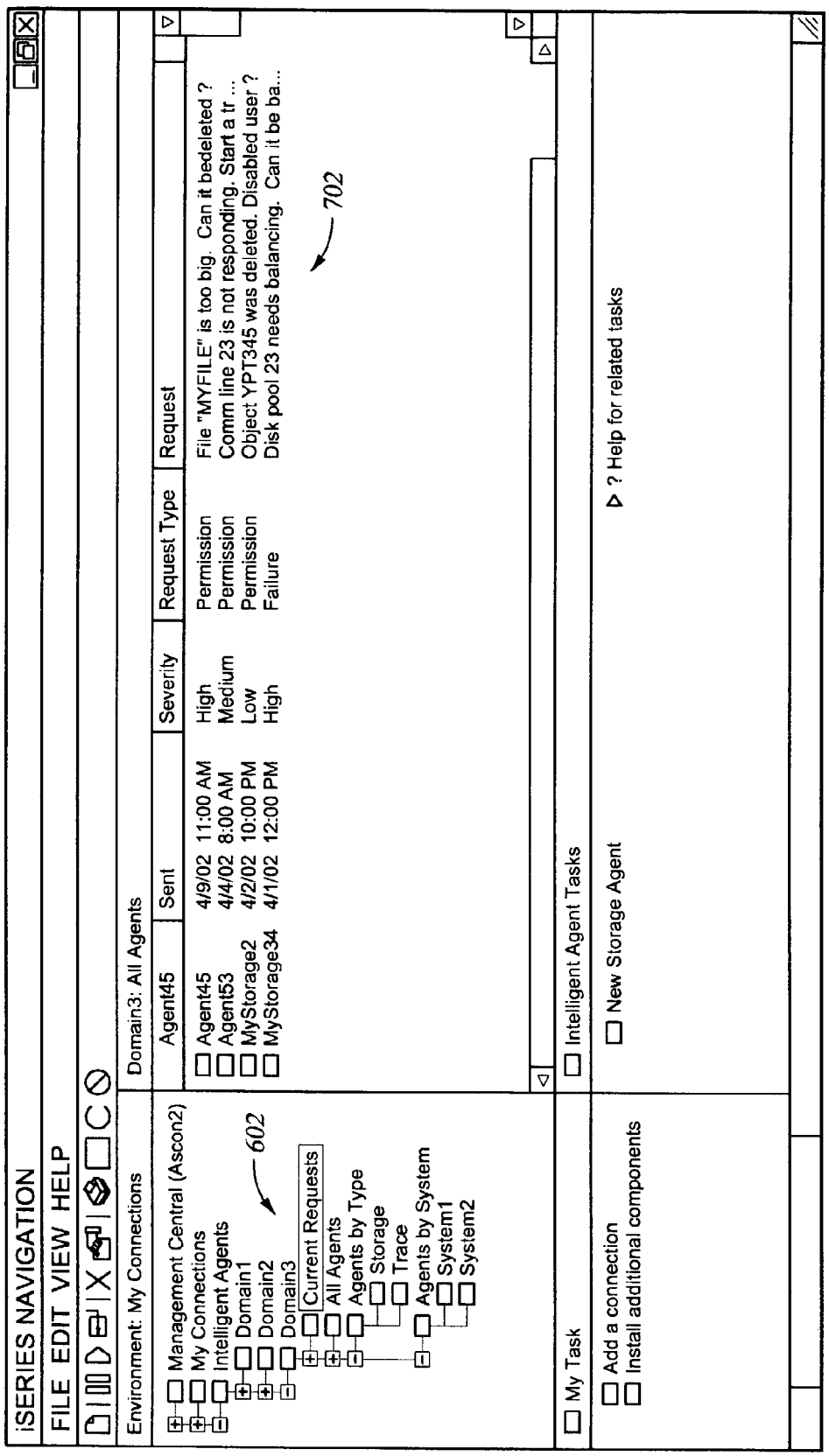
FIG. 7 is an instance of a user interface displaying all pending request for permission to take action in response to a detected problem.
Figure 9:
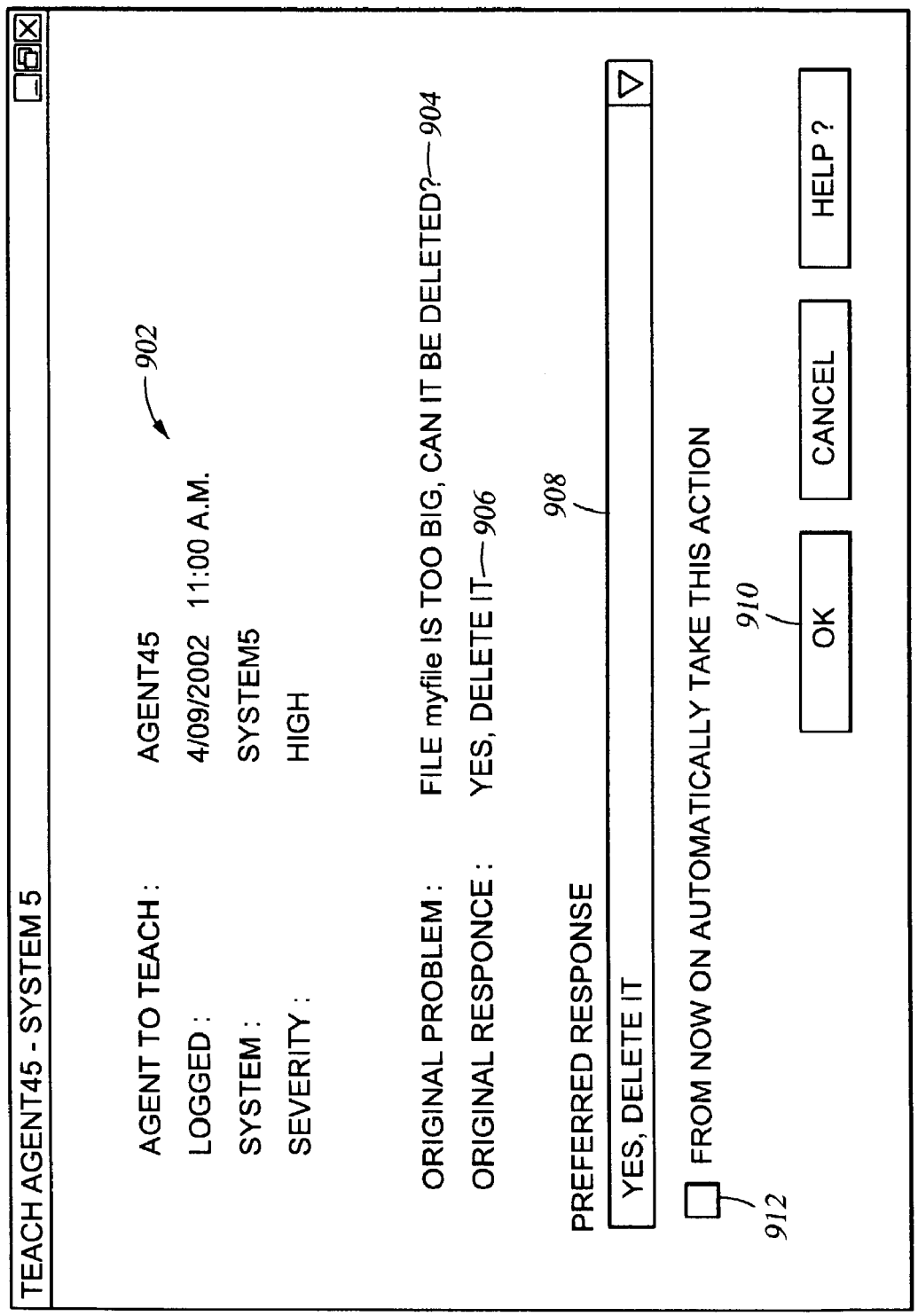
FIG. 9 is an instance of a user interface displayed when a user elects to teach an agent.
Figure 10:
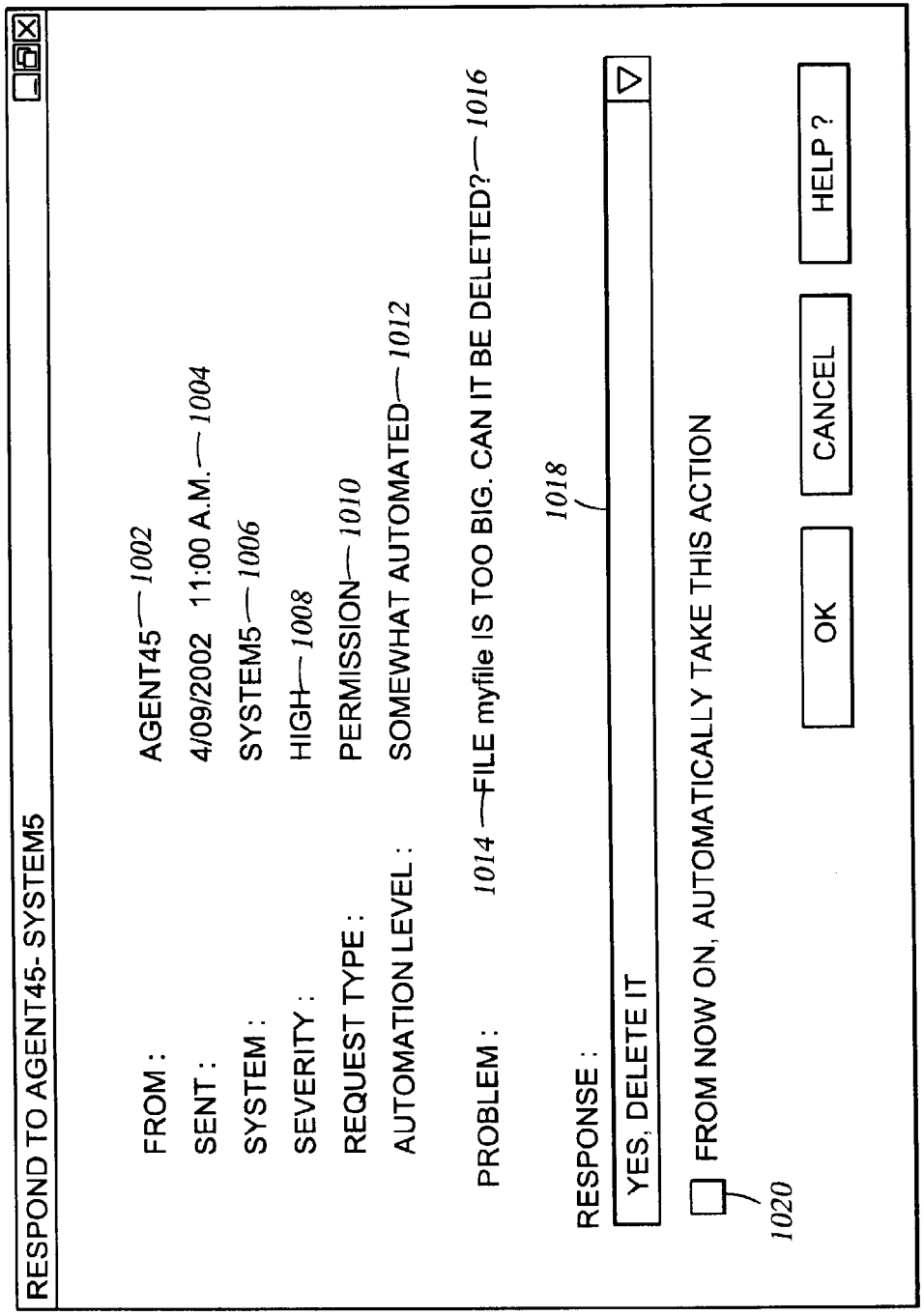
FIG. 10 is an instance of a user interface displayed to a user when an agent requires permission to take action in response to a detected situation.

As was noted above, agents which encounter a situation for which the agent has no authority to act, submit a request for permission to act to the notification mechanism 212. The pending request for permission may be viewed by a user by selecting (logic line 506 of FIG. 5) the "Current Requests" container from the directory tree 602 of the user interface 206, as shown in FIG. 7. Selecting the "Current Requests" container reveals a frame 702 displaying each pending request for permission. The user may then select a particular request (step 522) and be presented with a response dialog window 1000 (step 524) as illustrated in FIG. 10. Recall that the window 1000 is provided to the user even though the agent has resumed monitoring for other situations. Accordingly, a user is able to interact with the system via the user interface 206 without interfering with the agent's activity. Illustratively, the window 1000 is formatted with various summary information including an agent identifier 1002, a timestamp 1004 indicating when the notification issued, a system identifier 1006, a severity indication 1008, a request type 1010 and an automation level indication 1012. The window 1000 further includes a problem statement 1014 and recommended action query 1016. In this example, the problem statement 1014 indicates a file is excessively large and the agent proposes deleting it (as indicated by the recommended action query 1016). A drop-down menu 1018 provides the user with a selection of actions. Preferably, the recommended course of action (as determined by agent 45 or some other entity, e.g., another agent) is displayed as the default selection. In addition, a checkbox 1020 is provided to automate the selected action in the event of future occurrences of the same problem. It is noted that the problem/situation description provided by the interfaces of FIGS. 9 and 10 are intentionally brief for simplicity. In practice, the situation may be comprehensively described according to the information preserved in the respective situation object. In one embodiment, the interfaces of FIGS. 9 and 10 may be configured with a "Details" button by which a user can access the details of a situation object.

The user may either approve the recommended action (in which case processing proceeds along the "YES" logic leg of step 526) or select a different action, i.e., from the drop-down menu 1018 (step 528). In either case, the situation being responded to is then validated (step 530). That is, a determination is made that the situation still exists. The validation may be done by providing the relevant situation object to the agent responsible for creating the object, or to some other agent. Validation involves the examination of the contents of the situation object (specifically, the environment data and the internal state data of the agent responsible for creating and population the situation object) in view of the present environment. Because the situation object comprehensively describes the detected situation, validation is substantially facilitated. In fact, in some cases, it is not possible to validate a detected situation at a later time without the information contained in the situation object of the present invention. This is because the computerized environment may have changed too substantially to allow "backtracking" and recreation of the environment at the time the situation was detected. If the situation is validated (step 532), then the agent-recommended or user-selected action is taken (step 534). Otherwise, no action is taken. Processing is then complete for the selected permission request (step 520).

Accordingly, various aspects of the invention provide significant advantages over the current state-of-the-art. In particular, a state of the environment in which a problem occurs (the problem context) is preserved for subsequent accessing by an agent or human operator. In this manner, the entity subsequently accessing the preserved problem context can fully appreciate the problem and make informed decisions or analyses. For example, a human operator can understand the nature of the problem, and decide whether an agent's selected action in response to the problem was appropriate. If the human operator identifies a superior response the agent can be trained accordingly. Preservation of the problem context also allows the agent that identified the problem to remain active and continue monitoring for other problems even though previously identified problems have not been resolved. The continued availability of an agent is particularly critical in, for example, a systems management environment where even a few minutes of inaction can be disastrous.

While the foregoing is directed to embodiments of the present invention, other and further embodiments of the invention may be devised without departing from the basic scope thereof, and the scope thereof is determined by the claims that follow.

What is claimed is:

1. A method, performed by one or more intelligent software agents in a computerized environment comprising: identifying a problem in the computerized environment; storing a context of the problem, wherein the stored context of the problem preserves sufficient information to validate an existence of the problem at a later point time; and at a later point in time: receiving a request to address the problem according to a corrective action; validating the existence of the problem after receiving the request; performing the corrective action if the existence of the problem is validated; logging the corrective action; and training the one or more intelligent software agents upon accessing, by the user, one of the corrective actions stored in the log.

2. The method of claim 1, wherein the context of the problem comprises at least one of (i) data describing a state of the computerized environment at a time when an intelligent software agent identified the problem; and (ii) internal state data of the intelligent software agent that identified the problem.

3. The method of claim 1, wherein the stored context describes a corrective action taken by an intelligent software agent in response to the problem.

4. The method of claim 1, further comprising notifying a user of the stored context.

5. The method of claim 1, further comprising taking corrective action with respect to the problem according to a user selection from a list of possible actions.

6. The method of claim 1, wherein identifying the problem is performed by a first intelligent software agent and the corrective action is performed by a second intelligent software agent.

7. The method of claim 1, further comprising storing one or more possible actions to address the problem.

8. The method of claim 7, further comprising identifying, for a user, a suggested corrective action from the stored one or more possible actions.

9. The method of claim 7, further comprising identifying, for a user, a corrective action taken by the intelligent software agent from the one or more possible actions.

10. The method of claim 7, further comprising notifying a user of the stored context and one or more possible actions.

11. The method of claim 7, further comprising making the context of the problem and the one or more possible actions to address the problem available for inspection by a user.

12. The method of claim 7, further comprising taking corrective action with respect to the problem according to a user selection of one of the possible actions.

13. The method of claim 7, further comprising: receiving a user instruction to take corrective action with respect to the problem according to a user-selected action different from the one or more possible actions; and configuring attributes of the intelligent software agent, whereby the intelligent software agent is trained.

14. The method of claim 7, wherein the context of the problem describes at least each aspect of a state of the computerized environment considered by the agent in determining the possible actions.

15. The method of claim 7, further comprising automatically performing a the corrective action selected from the possible actions without first requesting an instruction from a user indicating a desired action in response to the problem.

16. The method of claim 15, further comprising receiving training from a user with respect to the corrective action.

17. The method of claim 7, further comprising: receiving a user instruction to take a corrective action with respect to the problem according to a user-selected action different from the one or more possible actions; and configuring attributes of the intelligent software agent, whereby the intelligent software agent is trained to perform one of: (1) automatically perform the corrective action corresponding to the user-selected action without first requiring explicit user selection of the corrective action; and (2) display a menu of one or more possible corrective actions which include the corrective action corresponding to the user-selected action.

18. A method, performed by one or more intelligent software agents in a computerized environment comprising: performing an assigned function; identifying a problem; storing a context of the problem, wherein the stored context of the problem preserves sufficient information to validate an existence of the problem at a later point in time; continuing performance of the assigned function prior to performing an action directed to resolving the problem; and at the later point in time: receiving a request to address the problem according to a corrective action; validating the existence of the problem after receiving the request; performing the corrective action if the existence of the problem is validated; logging the corrective action; and training the one or more intelligent software agents upon accessing, by the user, one of the corrective actions stored in the log.

19. The method of claim 18, wherein the context of the problem comprises at least one of (i) data describing a state of the computerized environment at a time when an intelligent software agent identified the problem; and (ii) internal state data of the intelligent software agent that identified the problem.

20. The method of claim 18, further comprising determining one or more possible actions to address the problem and storing the one or more possible actions with the context of the problem.

21. The method of claim 20, further comprising: receiving a request to address the problem according to the stored one or more possible actions; and validating an existence of the problem.

22. The method of claim 18, further comprising: receiving a request to address the problem; and addressing the problem.

23. The method of claim 22, wherein addressing the problem comprises correcting the problem.

24. The method of claim 22, wherein storing the context comprises storing one or more possible actions, and wherein the request specifies one of the stored one or more possible actions.

25. The method of claim 22, further comprising; logging a corrective action taken to address the problem; and receiving training from a user with respect to the logged corrective action.

26. A computer readable medium containing a program which, when executed, causes one or more intelligent software agents to perform an operation in a computerized environment, the operation comprising: identifying a problem in the computerized environment; storing a context of the problem, wherein the stored context of the problem preserves sufficient information to validate an existence of the problem at a later point in time; and storing one or more possible actions to address the problem; and at the later point in timer: receiving a request to address the problem according to a corrective action; validating the existence of the problem after receiving the request; and performing the corrective action if the existence of the problem is validated; logging the corrective action; and training the one or more intelligent software agents upon accessing, by the user, one of the corrective actions stored in the log.

27. The computer readable medium of claim 26, wherein the context of the problem comprises at least one of (i) data describing a state of the computerized environment at a time when an intelligent software agent identified the problem; and (ii) internal state data of the intelligent software agent that identified the problem.

28. The computer readable medium of claim 26, the operation further comprising identifying, for a user, a suggested corrective action.

29. The computer readable medium of claim 26, the operation further comprising identifying, for a user, a corrective action taken by an intelligent software agent.

30. The computer readable medium of claim 26, the operation further comprising notifying a user of the stored context.

31. The computer readable medium of claim 26, the operation further comprising taking corrective action with respect to the problem according to a user selection.

32. The computer readable medium of claim 26, wherein the context of the problem describes at least each aspect of a state of the computerized environment considered by the agent in determining the possible actions.

33. The computer readable medium of claim 26, the operation further comprising automatically performing a the corrective action without first requesting an instruction from a user indicating a desired action in response to the problem.

34. The computer readable medium of claim 33, the operation further comprising receiving training from a user with respect to the corrective action.

35. The computer readable medium of claim 26, wherein identifying the problem is performed by a first intelligent software agent and the corrective action is performed by a second intelligent software agent.

36. The computer readable medium of claim 26, further comprising storing one or more possible actions to address the problem.

37. The computer readable medium of claim 36, wherein the context of the problem and the one or more possible actions to address the problem are stored to an object.

38. The computer readable medium of claim 36, further comprising: receiving a user instruction to take corrective action with respect to the problem according to a user-selected action different from the one or more possible actions; and configuring attributes of the intelligent software agent, whereby the intelligent software agent is trained.

39. A computer readable medium containing a program which, when executed, causes an intelligent software agent to perform an operation in a computerized environment, the operation comprising: performing an assigned function; identifying a problem; storing a context of the problem, wherein the stored context of the problem preserves sufficient information to validate an existence of the problem at a later time; and continuing performance of the assigned function prior to performing an action directed to resolving the problem; and at the later point in time: receiving a request to address the problem according to a action; validating the existence of the problem after receiving the request; and performing the corrective action if the existence of the problem is validated; logging the corrective action; and training the intelligent software agent upon accessing, by the user, one of the corrective actions stored in the log.

40. The computer readable medium of claim 39, wherein the context of the problem comprises at least one of (i) data describing a state of the computerized environment at a time when an intelligent software agent identified the problem; and (ii) internal state data of the intelligent software agent that identified the problem.

41. The computer readable medium of claim 39, the operation further comprising receiving a request to address the problem according to the stored one or more possible actions.

42. The computer readable medium of claim 39, the operation further comprising: receiving a request to address the problem; and addressing the problem.

43. The computer readable medium of claim 42, wherein addressing the problem comprises correcting the problem.

44. The computer readable medium of claim 42, wherein storing the context comprises storing one or more possible actions directed to the problem, and wherein the request specifies one of the stored one or more possible actions.

45. The computer readable medium of claim 42, the operation further comprising: logging a corrective action taken to address the problem; and receiving training from a user with respect to the logged corrective action.

46. The computer readable medium of claim 39, the operation further comprising determining one or more possible actions to address the problem and storing the one or more possible actions with the context of the problem.

47. The computer readable medium of claim 46, the operation further comprising: receiving a request to address the problem according to the stored one or more possible actions; and validating an existence of the problem.

48. A computer defining a computerized environment, comprising: a plurality of intelligent software agents executing in the computerized environment; a log containing at least one situation data structure, each situation data structure being created by one of the intelligent software agents in response to detecting a problem and containing a problem context describing a state of the computerized environment at a time when the intelligent software agent identified the problem and preserving sufficient information to validate an existence of the problem at a later time; and a user interface allowing interaction between a user and the plurality of intelligent software agents, and between the user and the situation data structures; wherein the user interface is configured with a user-selectable interface element which, when selected, displays one or more training screens for training one or more of the plurality of intelligent software agents; and wherein the interface element is presented to the user upon accessing, by the user, a situation data structure stored in the log.

49. The computer of claim 48, wherein the one or more training screens comprise: a problem description describing a particular problem detected by an intelligent software agent; a response description describing an action taken in response to the particular problem; and a menu of other user-selectable actions which may be taken in response to the particular problem.

50. The computer of claim 48, wherein the user interface is configured to allow the user, at the later point in time, to issue a request to address the problem according to a corrective action and thereby cause: validation of the existence of the problem; and performance of the corrective action if the existence of the problem is validated.

* * * * *